(12) United States Patent
Shieh

(10) Patent No.: US 6,793,754 B1
(45) Date of Patent: Sep. 21, 2004

(54) COVERED ROLL HAVING AN UNDER-LAYER FORMED OF RESIN INFUSED DENSELY PACKED FIBERS THAT PROVIDES INCREASED STRENGTH AND ADHESION PROPERTIES

(75) Inventor: Yang T. Shieh, Wallingford, PA (US)

(73) Assignee: Advanced Materials Corporation, Lester, PA (US)

( * ) Notice: Subject to any disclaimer, the term of this patent is extended or adjusted under 35 U.S.C. 154(b) by 46 days.

(21) Appl. No.: 09/723,697

(22) Filed: Nov. 28, 2000

Related U.S. Application Data

(63) Continuation-in-part of application No. 09/573,262, filed on May 18, 2000, now abandoned, which is a continuation-in-part of application No. 09/362,430, filed on Jul. 28, 1999, now Pat. No. 6,206,994, which is a continuation-in-part of application No. 09/363,328, filed on Jul. 28, 1999.

(51) Int. Cl.[7] .............................................. B65H 81/00
(52) U.S. Cl. ...................... 156/172; 156/87; 156/187; 156/190; 156/195; 156/285; 156/286; 492/50; 492/52
(58) Field of Search ................................ 156/187, 190, 156/195, 285, 286, 87, 172, 169, 173, 175; 492/50, 52

(56) References Cited

U.S. PATENT DOCUMENTS

| | | | |
|---|---|---|---|
| 2,614,058 A | * | 10/1952 | Franics ........................ 138/108 |
| 3,437,032 A | | 4/1969 | Manghimalani et al. |
| 3,480,498 A | * | 11/1969 | Paul, Jr. ........................ 118/50 |
| 3,490,119 A | * | 1/1970 | Fukuyama et al. ............ 492/52 |
| 3,599,306 A | | 8/1971 | Brafford |
| 3,616,070 A | | 10/1971 | Lemelson |
| 3,622,412 A | | 11/1971 | Ross |
| 3,646,651 A | * | 3/1972 | McGaughey et al. ......... 492/52 |
| 3,684,602 A | | 8/1972 | Ball |
| 3,707,752 A | | 1/1973 | Brafford et al. |
| 3,730,794 A | | 5/1973 | Ross |
| 3,800,381 A | | 4/1974 | Brafford et al. |
| 3,883,384 A | | 5/1975 | Hopkins |
| 4,242,783 A | | 1/1981 | Watanabe et al. |
| 4,248,062 A | * | 2/1981 | McLain et al. .............. 156/173 |
| 4,258,089 A | | 3/1981 | Anderson et al. |
| 4,288,058 A | | 9/1981 | Inman |
| 4,309,803 A | | 1/1982 | Blaszak |
| 4,368,568 A | * | 1/1983 | Watanabe ..................... 492/52 |
| 4,466,164 A | | 8/1984 | Tadokoro et al. |
| 4,472,335 A | | 9/1984 | Meyer et al. |
| 4,559,095 A | | 12/1985 | Babbin |
| 4,576,845 A | | 3/1986 | Krotchko |
| 4,705,711 A | | 11/1987 | Perna |
| 4,707,408 A | | 11/1987 | Iwasawa et al. |
| 4,760,232 A | | 7/1988 | Smith |
| 4,920,623 A | | 5/1990 | Neuhoffer et al. |
| 5,014,406 A | | 5/1991 | Kato et al. |
| 5,091,027 A | | 2/1992 | Watanabe |

(List continued on next page.)

FOREIGN PATENT DOCUMENTS

| | | |
|---|---|---|
| JP | 1-260092 | 10/1989 |
| WO | WO 94/09208 | 4/1994 |
| WO | WO 95/17298 | 6/1995 |

Primary Examiner—Jeff H. Aftergut
(74) Attorney, Agent, or Firm—Caesar, Rivise, Bernstein, Cohen & Pokotilow, Ltd.

(57) ABSTRACT

A covered roll is disclosed. Under an exemplary embodiment, the covered roll includes a roll core base, an under-layer formed of densely packed fibers and a covering layer. The under-layer, which may include straight and directionally oriented fibers, is infused with a thermoset resin and circumferentially surrounds the roll core base. The covering layer, which may be formed of a rubber, urethane, thermoset resin or other plastics, circumferentially surrounds the under-layer. The resin infused under-layer provides improved strength to the resulting covered roll and improves adhesion between the covering layer and the metal roll core.

8 Claims, 12 Drawing Sheets

U.S. PATENT DOCUMENTS

| | | |
|---|---|---|
| 5,257,966 A | 11/1993 | Watanabe et al. |
| 5,261,980 A * | 11/1993 | Pearce .................. 156/173 |
| 5,319,430 A | 6/1994 | DeBolt et al. |
| 5,324,248 A | 6/1994 | Quigley |
| 5,334,124 A | 8/1994 | Ohno |
| 5,376,448 A | 12/1994 | Suzuki et al. |
| 5,387,172 A | 2/1995 | Habenicht et al. |
| 5,411,463 A * | 5/1995 | Brookstein .................. 29/530 |
| 5,468,531 A | 11/1995 | Kikukawa et al. |
| 5,549,154 A | 8/1996 | Niskanen et al. |
| 5,571,066 A | 11/1996 | Kayser |
| 5,597,652 A | 1/1997 | Utsunomiya et al. |
| 5,601,920 A | 2/1997 | Paasonen et al. |
| 5,633,075 A | 5/1997 | Park et al. |
| 5,639,549 A | 6/1997 | Fukunaga et al. |
| 5,655,444 A | 8/1997 | Kayser et al. |
| 5,694,734 A | 12/1997 | Cercone et al. |
| 5,723,214 A | 3/1998 | Yamazaki et al. |
| 5,746,124 A | 5/1998 | Kayser |
| 5,780,131 A | 7/1998 | Paasonen et al. |
| 5,785,636 A | 7/1998 | Bonander et al. |
| 5,789,078 A | 8/1998 | Eikleberry et al. |
| 5,958,533 A | 9/1999 | Paasonen et al. |

* cited by examiner

COVERED ROLL HAVING AN UNDER-LAYER FORMED OF RESIN INFUSED DENSELY PACKED FIBERS THAT PROVIDES INCREASED STRENGTH AND ADHESION PROPERTIES

RELATED APPLICATIONS

This application is a continuation-in-part of application Ser. No. 09/573,262 ("the '262 application"), filed on May 18, 2000, now abandoned which, in turn, is a continuation-in-part of application Ser. No. 09/362,430 ("the '430 application") now U.S. Pat. No. 6,206,994 and application Ser. No. 09/363,328 ("the '328 application"), both filed on Jul. 28, 1999. This application claims priority under 35 U.S.C. § 120 to the '262 application, the '430 application and to the '328 application, the disclosures of which are incorporated by reference herein.

BACKGROUND OF THE INVENTION

Covers for roll cores are used in demanding industrial environments such as paper mills and are subjected to high temperatures, corrosive chemicals and dynamic loads. In a typical paper mill, large numbers of covered rolls are utilized for transporting web sheets which become paper as well as for processing these web sheets into finished paper. It is essential that these covered rolls be precisely balanced and include surfaces that maintain specific configurations and tight tolerances. Calendering is a process utilized within a paper mill for improving the smoothness, gloss, printability and thickness of paper. Covered rolls utilized in these calendering processes, usually referred to as calender rolls, super-calendar rolls or soft nip calendar rolls are subjected to high dynamic loads. As previously mentioned, a calender roll actually contributes to the processing of the paper rather than merely transporting the web through the paper mill machinery. In order to function properly, a calendar roll must have a surface of a predetermined hardness of a high degree.

Several methods have been taught in the prior art for alleviating residual stresses that may develop during the heating and curing steps performed during the fabrication of covered roll cores. Residual stresses can develop for many reasons. For example, such stresses can result from a mismatch in the thermal expansion properties between the materials utilized in the cover and the material utilized in the roll core when these materials are bonded together.

Several methods which discuss reducing residual stresses in a covered roll are disclosed in U.S. Pat. Nos. 5,601,920 and 5,958,533, (both issued to Paasonen et al. and hereinafter collectively referred to as "the Paasonen patents"). Under the Paasonen patents, a compressive layer formed of a three-dimensional spacer fabric is included between a metallic roll core and a covering layer. The three-dimensional spacer fabric is formed of a top surface, a bottom surface and a void space or gap therebetween. The spacer fabric may be formed of suitable fibrous materials such as polyester, DACRON®, NYLON®, or fiberglass. Under the method disclosed in the Paasonen patents, the compressive layer formed of the spacer fabric is first applied to the metallic roll core. Next, the covering layer is placed over the compressive layer and allowed to fully cured. The void space or gap within the compressive layer is arranged to change in volume in response to volume changes in the covering layer which occur during curing to avoid the buildup of residual stresses. After the covering layer has been allowed to cure, a relatively high viscosity thermoset polymer is injected, by positive pressure, through holes drilled through the covering layer and into the void space within the compressive layer which upon curing is said to add strength to the resulting covered roll.

While the aforementioned compressive layer disclosed in the Paasonen patents may provide some degree of residual stress reduction, there are several drawbacks to the construction of the compressive layer of the Paasonen patents that could be surmounted to increase the overall strength of the resulting covered roll and increase the adhesion between the covering layer and the metal roll core. First, while the void space or gap of the compressive layer may make possible the injection of certain highly viscous thermoset resins therein where those resins are injected by positive pressure, the large portion of the injected thermoset will cure within the void space defined within the spacer fabric rather than bind with the fibrous material forming the spacer fabric. Only a small portion of the injected thermoset material will actually bind with the spacer fabric. The larger unbound portion of thermoset resin will form a weak brittle mass that will do little to add to the overall strength of the resulting covered roll and will do little to serve to increase the adhesion between the metal roll core and the covering layer. Secondly, the fibers of the compressive layer disclosed in the Paasonen patents are not oriented or aligned in any manner that would increase the overall strength of the covered roll. By orienting long continuous fibers in directions parallel and perpendicular to the longitudinal axis of the metal roll core, a covered roll having increased strength may be realized. Moreover, by adjusting the orientation of these longitudinally and axially oriented fibers, the strength of the resulting covered roll may be tailored to suit a customer's requirements for different industrial applications. Also, the inclusion of such oriented long continuous fibers increases adhesion between the covering layer and the metal roll core.

SUMMARY OF THE INVENTION

Under the present invention, the covered roll core comprises a roll core base, an under-layer formed of a densely packed fiber under-layer and a covering layer circumferentially surrounding the under-layer. After the covering layer has been applied to the under-layer, it is allowed to cool from its cure temperature. After cooling, the under-layer, formed of densely packed fibers is infused with a thermoset resin by use of vacuum pressure. Due to the dense packing of fibers in the under-layer; most of the infused thermoset resin will bind with the fibers to form a stronger covered roll. This construction will also result in greater adhesion between the covering material and the metal roll core. Also, because a larger amount of infused thermoset resin will be bound up with the densely packed fibers of the under-layer, a lower viscosity thermoset resin may be employed to maximize the fiber-resin ratio in the resulting composite. The densely packed fiber under-layer will also provide added strength and greater adhesion because it is comprised of a plurality of directionally oriented fibers. Any suitable covering material may be employed in combination with the densely packed fiber mat under-layer.

In a variation of the first embodiment, the covering layer comprises a helically wound strip of rubber.

In another variation of the first embodiment, the covering layer comprises at least one sheet of rubber.

In another variation of the first embodiment, the covering layer comprises a plurality of rubber sheets.

In another variation of the first embodiment, the covering layer comprises a helically wound fabric strip impregnated with a thermoset resin.

In another variation of the first embodiment, the covering layer comprises urethane.

In another variation of the first embodiment, the covering layer is applied to the densely packed fiber mat under-layer by casting.

In another variation of the first embodiment, the covering layer comprises a strip of urethane.

In another variation of the present invention, a vacuum system is utilized for infusing thermoset resin into the densely packed fibers forming the under-layer.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE REFERRED EMBODIMENTS

Figure 1:
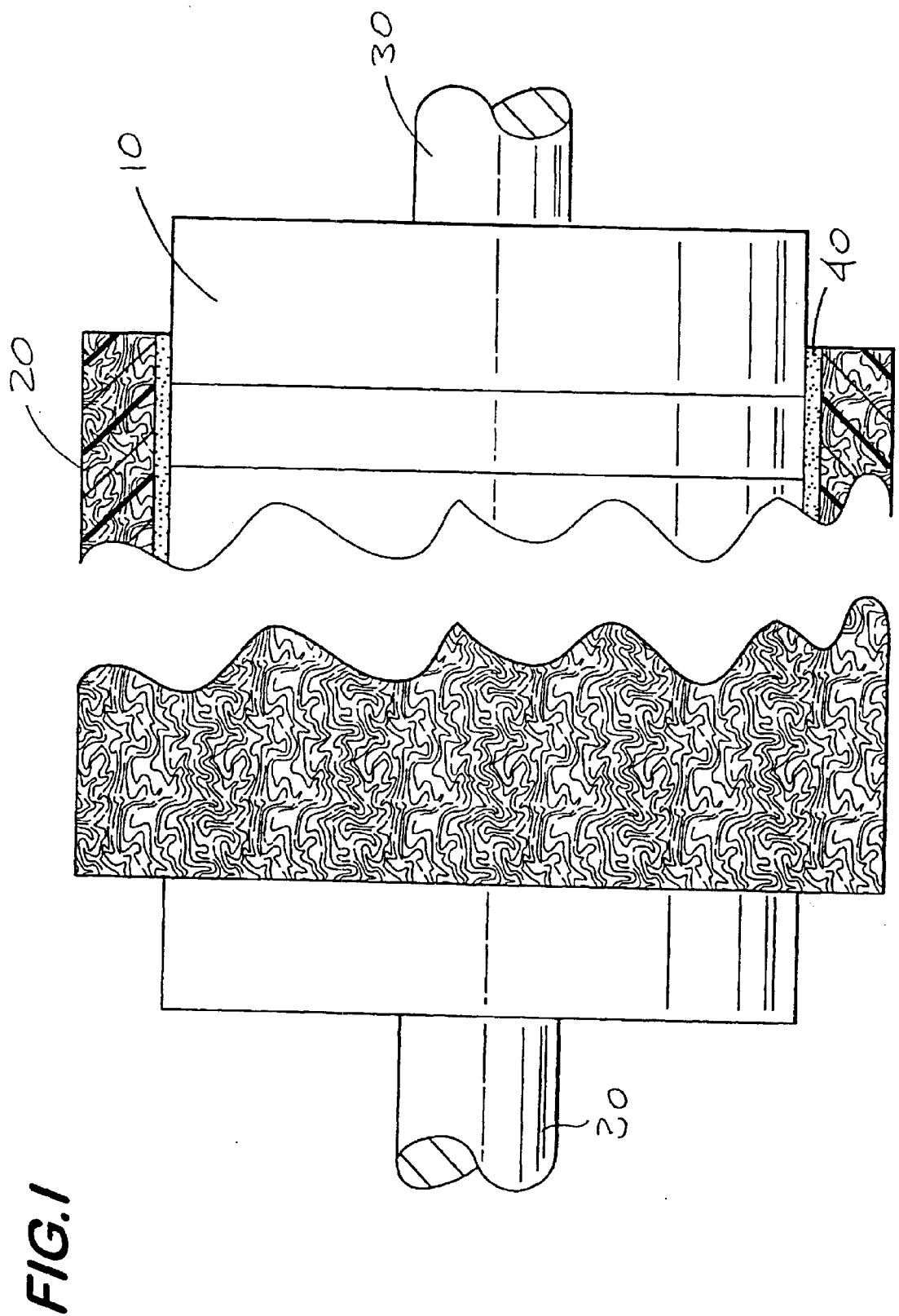
FIG. 1 is a partial sectional view of a roll core on which a densely packed fiber mat under-layer is applied in accordance with the present invention.

Referring now in greater detail to the various figures of the drawings wherein like reference numerals refer to like parts there is shown at 10 in FIG. 1, a metal roll core covered with a fiber mat under-layer 20 in accordance with the method of the present invention. The metal roll core 10 is of a predetermined length and is generally cylindrical in shape and includes a central axis and an outer surface formed of any suitable material, e.g., metal. The roll core include journals 30 that are concentric with the central axis of the metal roll core 10 to enable securement of the metal roll core 10 within the opposed universal chucks (not shown) to enable rotational movement of the roll core while maintaining the metal roll core 10 in a horizontal orientation.

At the start of the process, a spent roll, e.g., a roll used in calendaring, is returned from a customer such as a paper mill, textile mill or magnetic film manufacturer where such covered rolls are utilized in manufacturing finished products. The spent roll is returned from the customer with the cover substantially consumed and, therefore, a new cover must be applied. First, after the remaining cover material has been physically removed, the outer surface of the metal roll core 10 must be thoroughly cleaned in ways known to those practiced in this art to remove all remaining cover material. The cleaning process includes de-greasing or removing all greases and/or oils remaining on the outer surface of the metal roll core 10 by utilizing known solvents and solutions.

Next, the entire outer surface of the metal roll core 10 is shot blasted for the purpose of removing all rust, dirt and remaining roll cover materials. After shot blasting, a chemical solution is brushed onto the freshly shot blasted outer surface of the metal roll core 10 in ways known to those practiced in the art. The chemical solution facilitates oxidation of the outer surface of the metal roll core 10 to enhance its adhesion with epoxy which will be applied as a primer, and/or infused into the densely packed fibers forming the under-layer 20 later in the process. Next, a layer of liquid epoxy primer 40 is applied over the entire outer surface of the roll core 10 to enable adhesion with the dry fiber mat under-layer 20 which is tightly wrapped thereover.

Figure 1A:
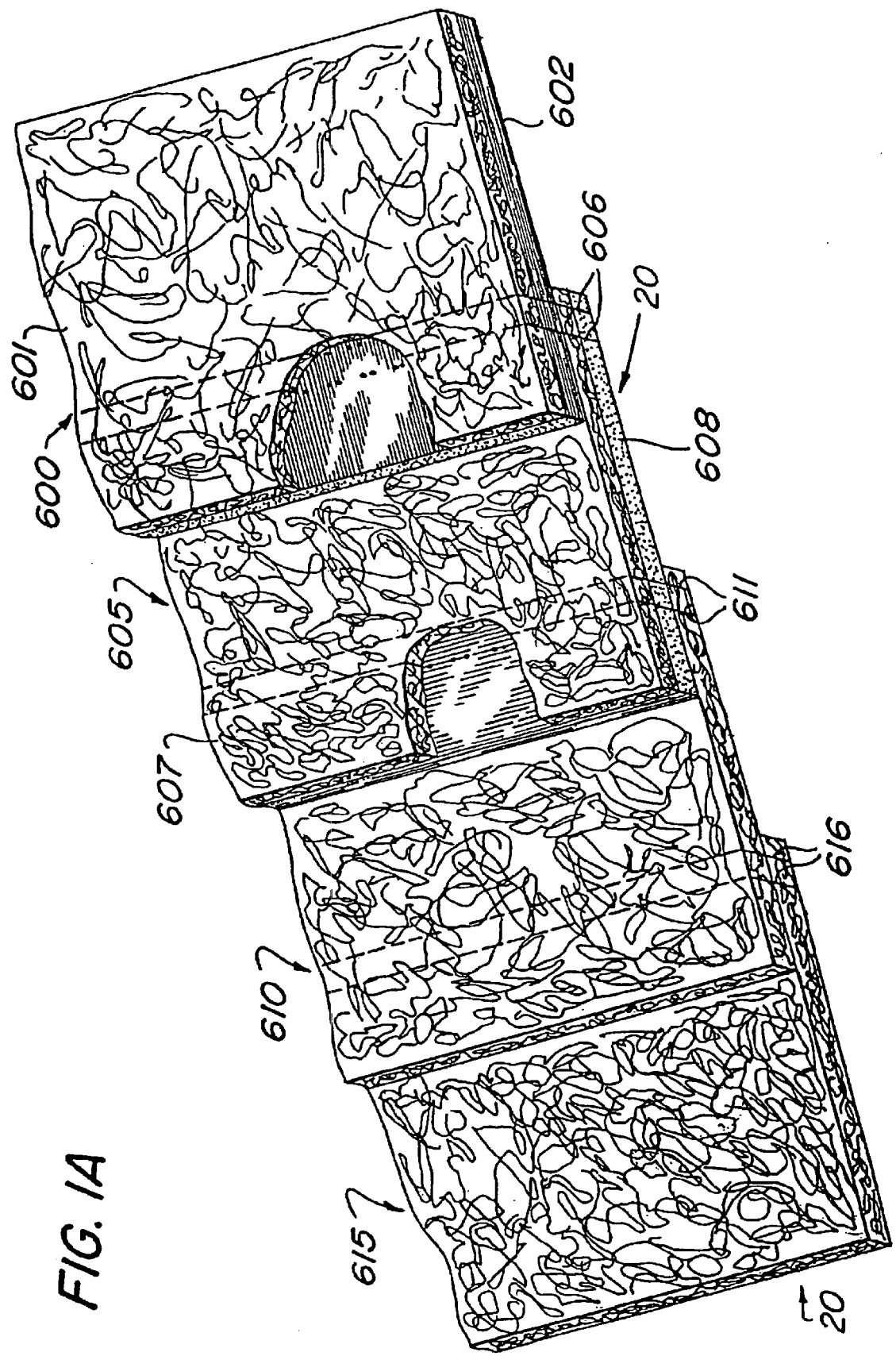
FIG. 1A is an isometric view of the dry fiber mat under-layer fabricated in accordance with the present invention.
Figure 1B:
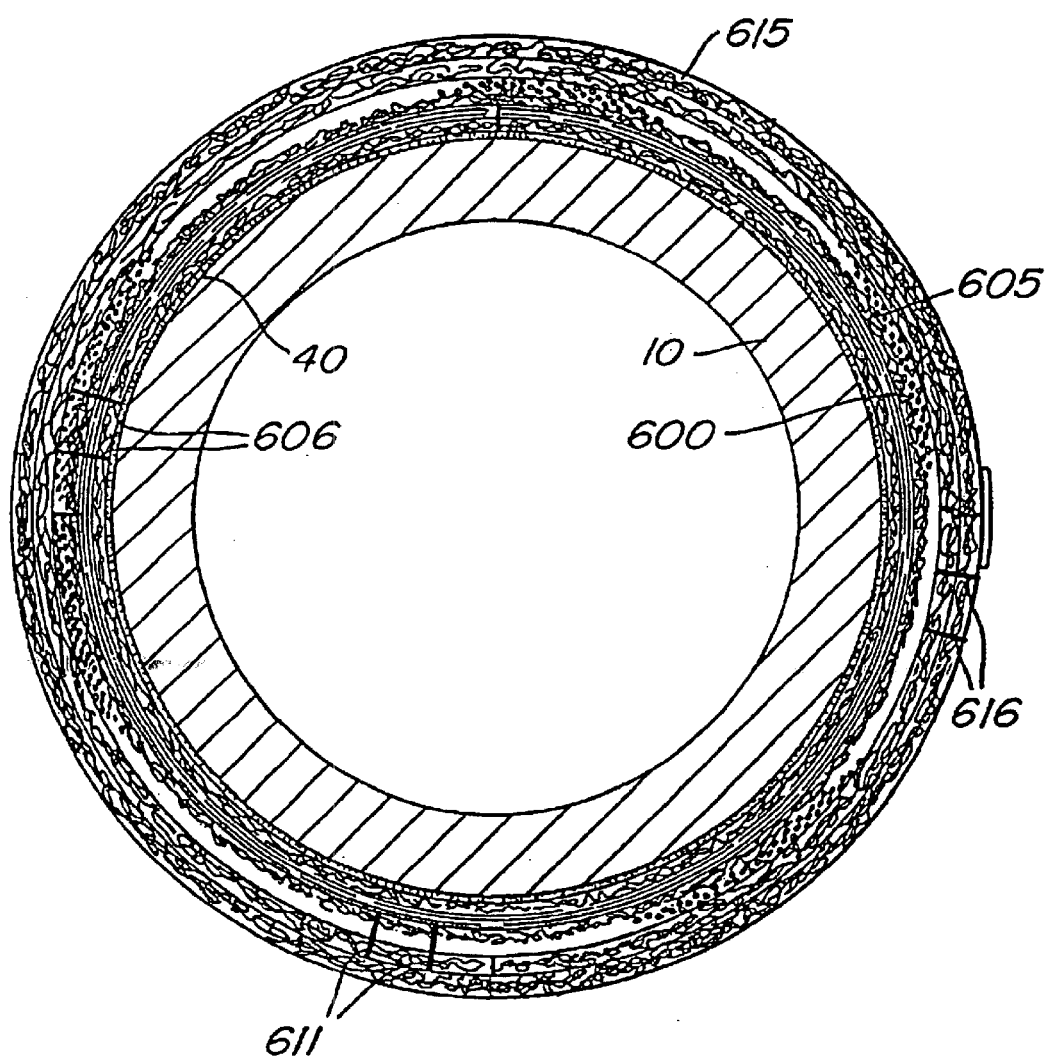
FIG. 1B is a cross-sectional view of a metal roll core with the dry fiber mat under-layer wrapped thereover in accordance with the present invention.

The steps involved in the fabrication of the fiber mat under-layer 20 and the manner for tightly wrapping the fiber mat under-layer 20 over the outer surface of the metal roll core 10 are fully discussed and illustrated in the '262 application, the disclosure of which is incorporated by reference herein. As discussed in the '262 application, the under-layer 20 may be formed of a single continuous layer of densely packed fiber material or may comprise a plurality of sub-layers of densely packed fiber material sewn to each other. FIGS. 1, 2 through 9, 10 and 11 illustrate embodiments of the fiber mat 20 that is comprised of a single layer of densely packed fibers that are arranged in a random pattern. The fiber mat under-layer 20 of this embodiment is between 0.25 and 0.32 inches in thickness and preferably 0.30 inches in thickness. By contrast, FIGS. 1A and 1B illustrate an embodiment of the fiber mat 20 that is comprised of a plurality of layers of densely packed fibrous material including an inside layer 600, a second layer 605, a third layer 610 and an outside layer 615. The various layers are formed of densely packed fibers and are affixed to each other in a suitable overlapping arrangement by any suitable means, e.g., stitches indicated at 606, 611 and 616, to form seams. The resulting fiber mat under-layer 20 is between 0.25 and 0.32 inches in thickness and preferably 0.30 inches in thickness. The number of layers of fabric and their structures and materials, as well as thickness can be engineered differently to obtain strengths in different directions, e.g., axial strength, circumferential strength and radial strength, for different applications.

As shown in FIGS. 1A and 1B, the layers 600 and 605 of the dry fiber mat are each formed of a two-ply construction. That is, the inner layer 600 is formed of a first ply 601 of densely packed fibers arranged in a random pattern and a second ply 602 of densely packed continuous unidirectional long continuous fibers that are parallel to each other and oriented perpendicular to the central axis of the roll core 10. The second layer 605 is formed of a first ply 607 of densely packed fibers arranged in a random pattern and a second ply 608 of densely packed unidirectional long continuous fibers that are parallel to each other and oriented parallel to the central axis of the roll core 10. By including continuous straight fibers that are linear and oriented in parallel and perpendicular directions with respect to the central axis of the roll core, the under-layer 20 provides enhanced strength in axial, circumferential and radial directions. The inclusion of such continuous straight fibers also enhances the adhesion of the covering layer 60 (FIGS. 3–5) and 65 (FIGS. 8 through 10) to the metal roll core 10 since these fibers dramatically reduce the coefficient of thermal expansion of the under-layer 20 after it has been infused with an epoxy resin that has cured. Specifically, continuous straight fibers oriented parallel to the central axis of the roll core will reduce the coefficient of thermal expansion of the infused under-layer 20 in the direction parallel to the central axis of the roll core. Likewise, continuous straight fibers oriented radially or circumferentially with respect to the central axis will reduce the coefficient of thermal expansion of the infused under-layer 20 in those directions. Reduction of the coefficient of thermal expansion enhances the strength of the resulting roll core and provides better adhesion between the covering layer and roll core. The third layer 610 and outside layer 615 are both formed of a single ply of densely packed fibers arranged in a random pattern which adds strength to the resulting covered roll. The metal roll core 10 is oriented horizontally for the wrapping thereover of the densely packed fiber mat under-layer 20. At this juncture it is important to mention that the fiber mat under-layer 20 is applied over the metal roll core 10 outer surface tightly under high pulling tension in a dry condition and without the infusion of any thermoset resin, e.g., epoxy, therein. It is not until after the covering layer 60 (FIGS. 3 through 5) and 65 (FIGS. 8 through 10) is applied over the previously applied fiber mat under-layer 20 that liquid epoxy resin is infused through the covering layer 60 or 65 and into the under-layer 20 and allowed to cure therein. The manner for infusing the epoxy resin will be explained in detail later in this application.

Figure 2:
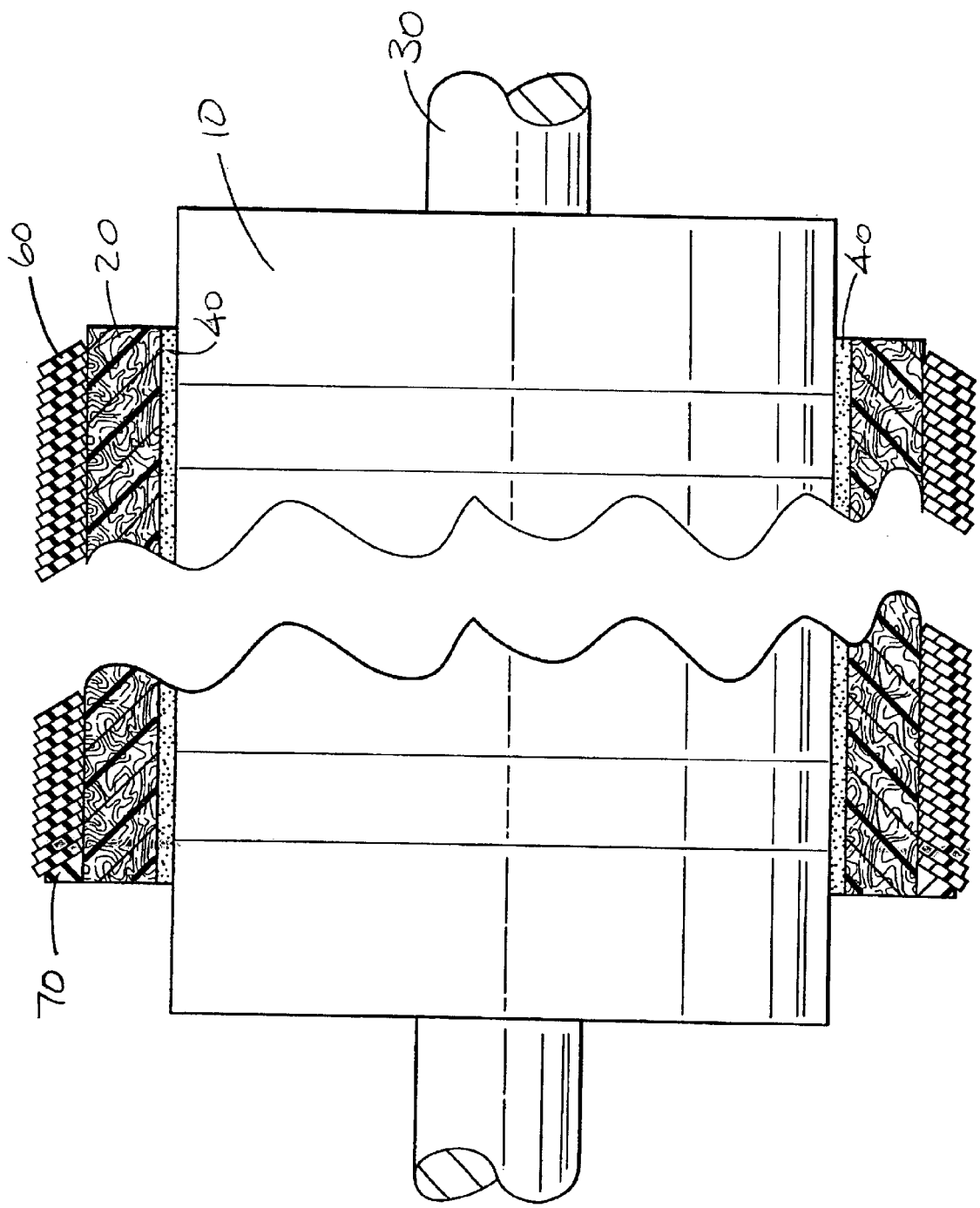
FIG. 2 is a partial sectional view of the covered roll core of the present invention shown with the fiber mat under-layer is disposed between the roll core and a covering layer.

Still referring to FIGS. 1 and 2, prior to applying the fiber mat under-layer 20 to the metal roll core 10, the outer surface of the roll core 10 is primed with epoxy 40. Thereafter, the under-layer 20 is tightly wrapped onto the metal roll core 10 outer surface. At this juncture, it is important to mention that under the embodiments being discussed in this disclosure, no preheating of the outside surface of the metal roll core 10 is necessary.

The under-layer 20 may be of any suitable construction and preferably is made of a woven sheet materials formed of densely packed fibers such as carbon fibers, aramid fibers (e.g., KEVLAR® fibers), or other mineral/metallic high strength fibers that have been interlaced or intertwined. The interlaced or intertwined arrangement of the fibers forming the under-layer is best illustrated in FIGS. 1A and 1B. In some instances, woven materials that may be applied as one or more covering layers may be suitable for use as the under-layer 20. In other instances, braided fabric comprised of two or more types of fiber, those differing fiber types having the same or different orientations may be applied. The number of layers of fiber mat 20 and its structures, materials and blends, as well as thickness can be engineered to obtain strengths in different directions, e.g., axial, circumferential and/or radial, for different applications. As mentioned previously, the fiber mat under-layer 20 may be formed of a single continuous layer of densely packed fiber material or may comprise a plurality of sub-layers of densely packed fiber material sewn to each other.

Referring now to FIG. 2, once the fiber mat under-layer 20 has been applied to the metal roll core 10, the under-layer 20 is tightly secured to the roll core 10 by utilizing a plurality of ties in the manner described in the '262 application.

The next step in the process is the application of the covering layer 60 over the previously applied under-layer 20. At this juncture, it is important to mention that the fiber mat under-layer 20 of the present invention may be employed with a covering layer 60 selected from a variety of suitable material that have been known and utilized in the prior art for covering roll cores used in demanding industrial environments. For example, materials for use in the covering layer 60 contemplated in accordance with this invention include extrudable elastomers such as rubbers or processable urethanes, high viscosity thermoset resins such as polyurethanes and epoxies in general. Rubber compositions that could be employed as suitable covering layers include styrene-butadiene rubber, nitrile rubbers and, hydrogenated nitrile rubbers, with or without reinforcement. The covering layer 60 may be applied in the form of a continuous strip or, alternatively, could be provided in sheet form.

Alternatively, the covering layer 60 could be formed of a strip of a fibrous carrier formed of a suitable material, e.g., glass fibers, carbon fibers, KEVLAR® fibers, etc., that has been soaked in a suitable epoxy material such as those mentioned above.

Figure 3:
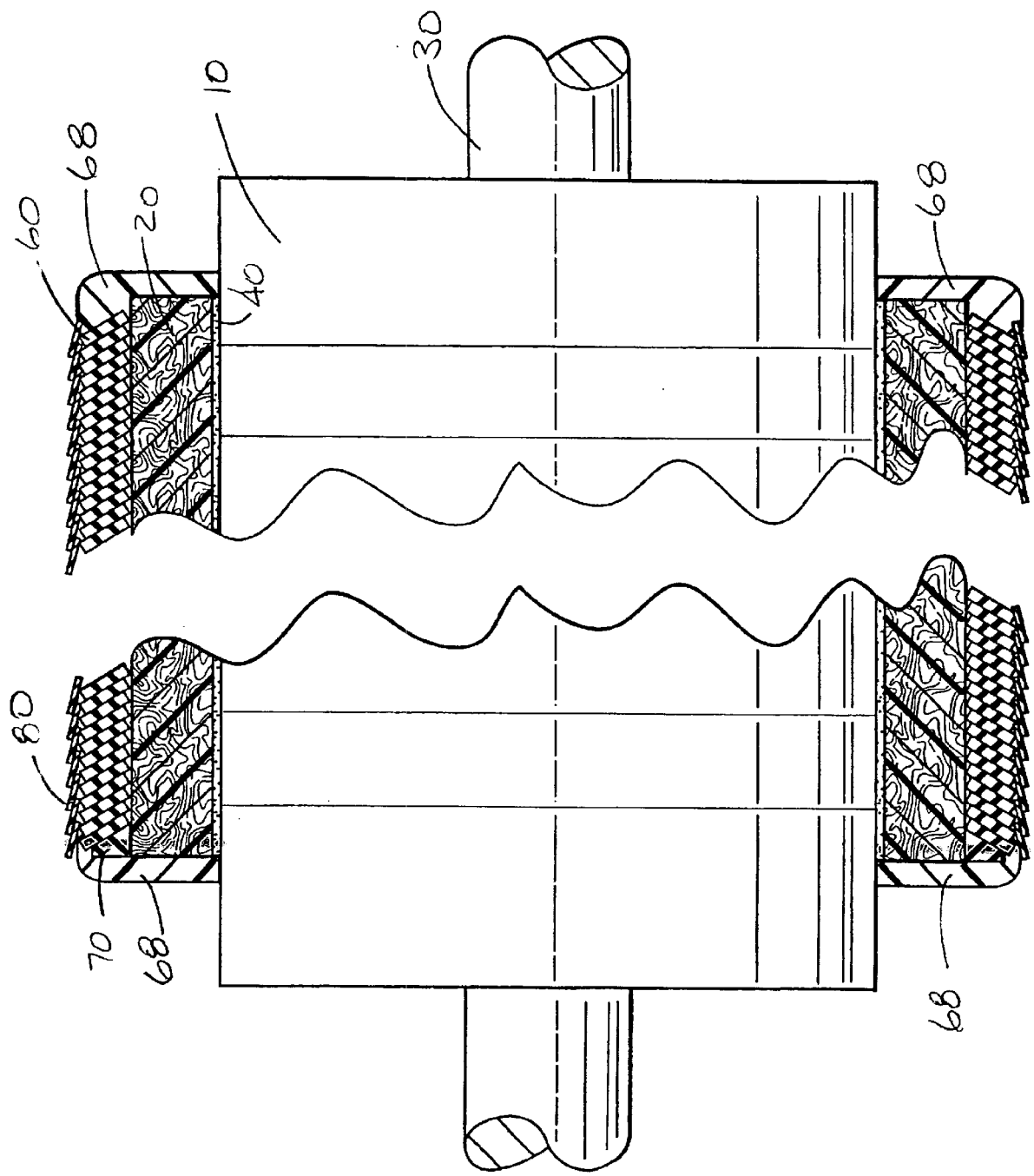
FIG. 3 is a partial sectional view of the covered roll core of the present invention shown with seals applied in proximity to both ends of the roll core and wherein a fabric strip is applied to the outer surface of the covering layer to prevent sagging of the covering layer during a vulcanizing step.

A first exemplary embodiment is shown in FIG. 2. Under this embodiment, as the horizontally oriented roll core is rotated, a strip of rubber 60, several inches in width, is extruded onto the fiber mat under-layer 20 disposed over the metal roll core 10. As best shown in FIG. 3, the rubber strip 60 is helically wound over substantially the entire length of the metal roll core 10 with each subsequent wrap of the rubber strip 60 overlapping a portion of the previous wrap. The amount of overlap can be varied based upon customer requirements. One pass across the substantial length of the roll core 10 is sufficient for application of the rubber strip 60. Spacer blocks 70, formed of any suitable material, e.g., wood or rubber, are utilized to prop up the extruded rubber windings at a predetermined angle. The fibers of the fiber mat under-layer 20 are dry and therefore slightly compressible when the covering layer 60 is applied thereover. During cooling of the extruded covering layer 60, shrinkage may occur in a direction perpendicular to the central axis of the roll core 10. Any stresses that may build due to shrinkage of the covering layer 60 in this direction will be taken up or relieved by the under-layer 20 due to the fact that the under-layer is compressible while dry. Shrinkage of the covering layer 60 may also occur in the direction parallel to the central axis of the roll core. Residual stresses resulting from shrinkage of the covering layer 60 in this direction will be avoided because the covering layer may slide over the dry under-layer 20. Likewise, the covering layer 60 may slide over the dry under-layer 20 as the result of shrinkage occurring in the direction circumferential to the central axis. Next, a length of shrink strip 80 is wound over the layer 60 formed of the rubber strip to prevent sagging of the rubber strip during vulcanizing.

Figure 8:
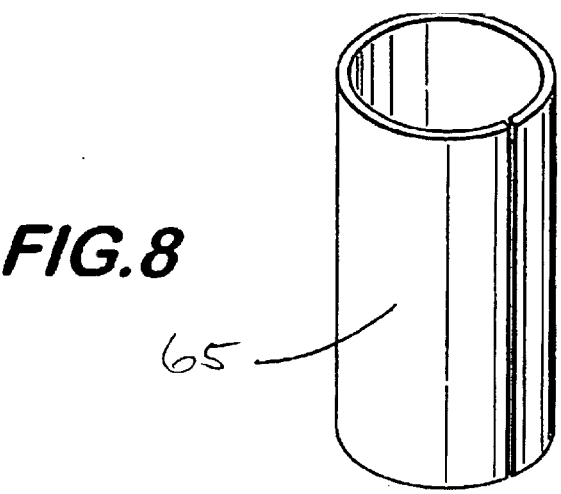
FIG. 8 is an isometric view of a cylindrically shaped sheet material which is suitable for applying as a covering layer for the covered roll core of the present invention.
Figure 10:
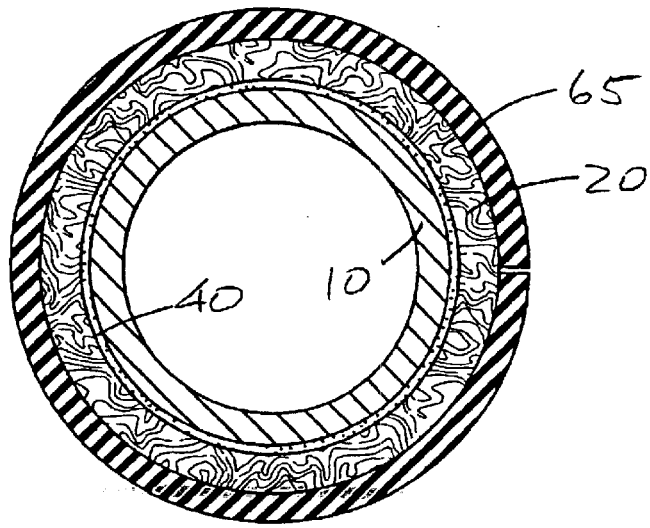
FIG. 10 is a sectional view taken through line 10—10 of FIG. 9.
Figure 11:
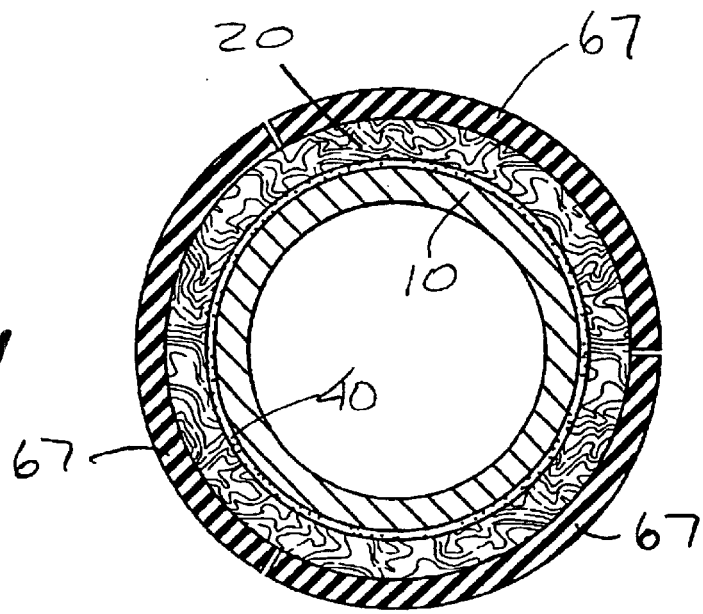
FIG. 11 is a sectional view of an additional embodiment of the covered roll core of the present invention wherein the covering layer is formed of a plurality of rubber sheets abutting one another and encircling the fiber mat under-layer.
Figure 9:
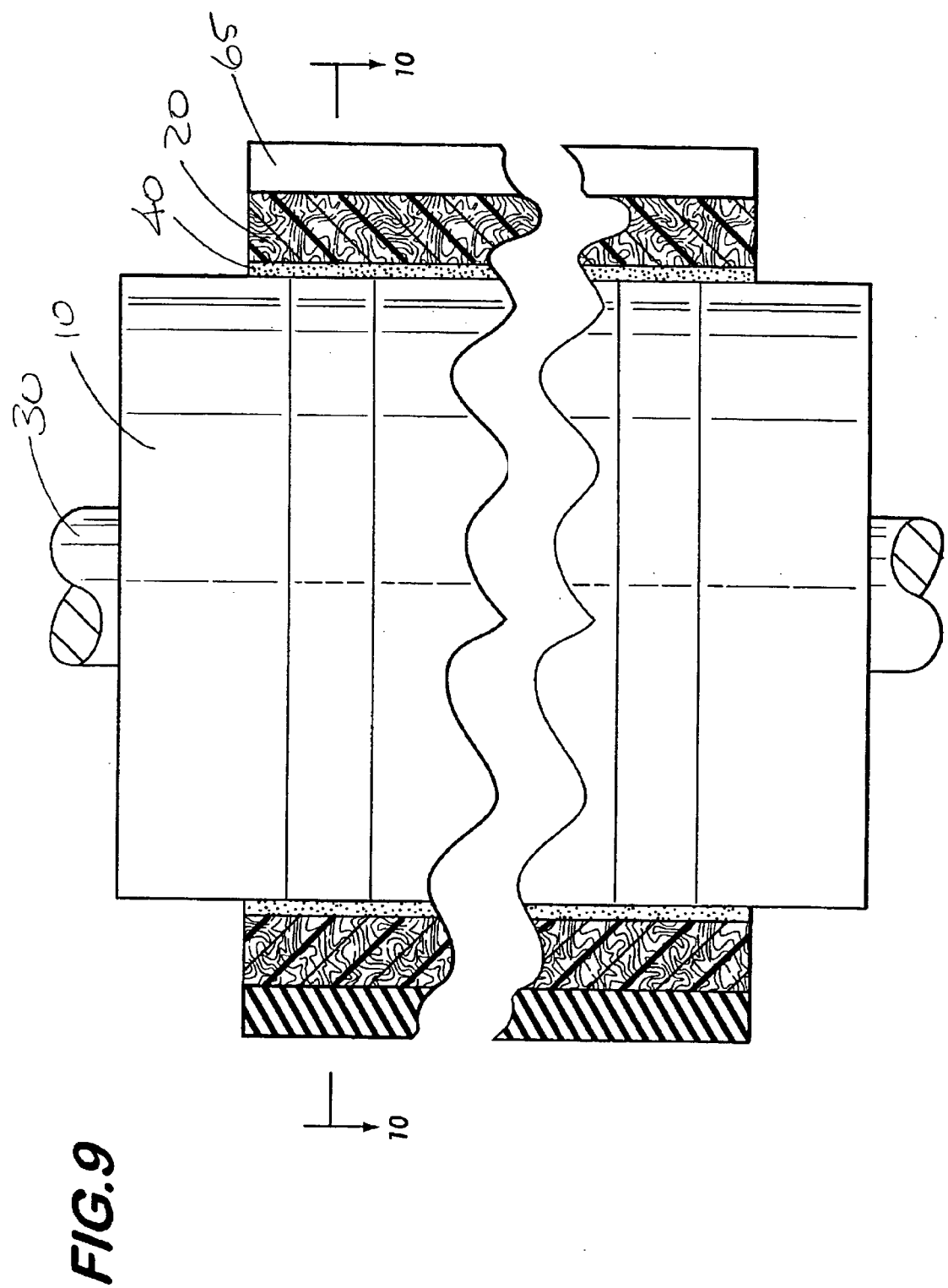
FIG. 9 is a partial sectional view of the covered roll core of the present invention shown with the fiber mat under-layer disposed between the roll core and a covering layer formed of a single rubber sheet that has been wrapped around the under-layer.

Referring now to FIGS. 8 through 10, in an alternative embodiment, the rubber may be provided in sheet form 65, sized to extend substantially the length of the metal roll core 10 and to encircle completely the circumference of the metal roll core 10 with the under-layer 20 applied thereover to form the covering layer. FIG. 10 illustrates that the rubber sheet 65 is cut to size so that its edges abut one another after the sheet 65 is applied over the fiber mat under-layer 20. Referring now to FIG. 11, in yet another alternative embodiment, the rubber covering layer may be provided in the form of a plurality of sheets 67 cut to size in rectangular segments so that when applied over the fiber mat under-layer 20, they join together in abutting relation to one another to encircle completely the circumference of the metal roll core 10. The edges of the sheets 67 may then be cohered to each other. The rubber covering layer is applied with rollers to flatten out any bumps that may result at the cohered edges of the covering sheets 67. The rubber covering layer may be of any suitable thickness, e.g., 0.25 inches to 1.00 inches.

Next, as best shown in FIG. 3, while the roll core continues to be maintained in a horizontal orientation, a length of shrink strip 80 is tightly wrapped over the rubber strip 60. During a vulcanizing process, to be explained in detail below, the rubber strip 60 becomes soft which can result in sagging of the rubber strip 60 while the roll core is horizontally oriented. The tightly wrapped shrink strip 80 prevents the rubber strip from sagging. By maintaining the rubber strip 60 in contact with the fiber mat under-layer 20, moisture is prevented from collecting between the rubber strip 60 and the under-layer 20. This will ensure a greater adhesion of the covering layer 60 to the under-layer 20.

Also, prior to the vulcanizing step, a length of sealant 68 is applied to ensure that no moisture enters between the rubber strip 60 and the dry under-layer 20 during a wet vulcanizing process to be explained below. The sealant 68 is also provided to prevent any leakage of epoxy resin that may result from downward gravitational movement of the epoxy resin during the infusion process. As shown in FIG. 3, the sealant 68 is applied to cover both ends of the under-layer 20, both ends of the rubber strip 60 extruded thereover and both ends of the shrink strip 80. The sealant 68 may be formed of rubber, vinyl, plastic, or any other suitable caulking material that is resistant to heat.

Figure 4:
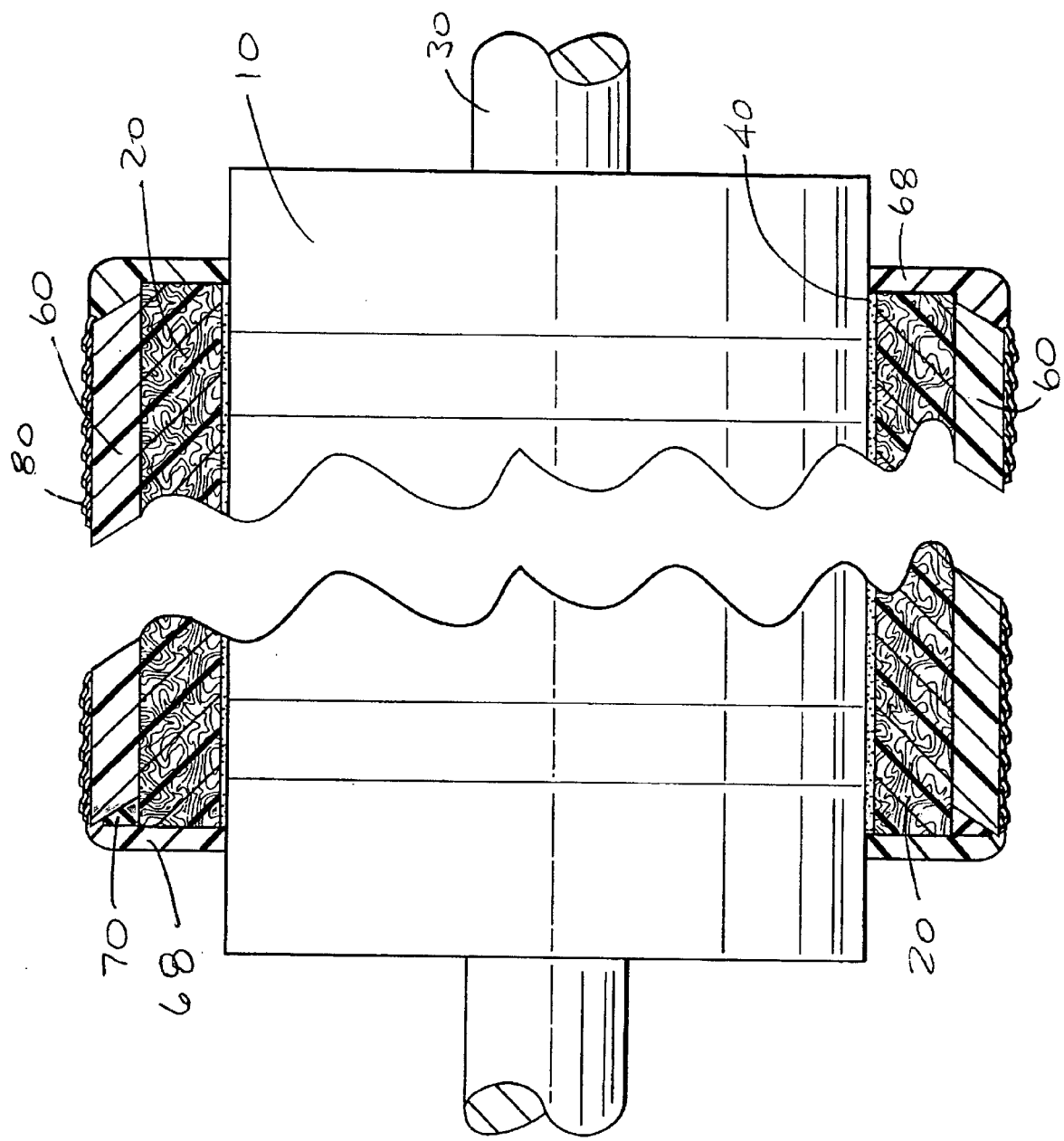
FIG. 4 is a partial sectional view of the covered roll core of the present invention after the vulcanizing step has been performed.

Next, the metal roll core 10 with the under-layer 20 and rubber strip 60 disposed thereon is placed into a chamber (not shown) to cure the rubber strip 60 by vulcanizing. Vulcanizing is a known technique for curing rubber. Generally, vulcanizing can be performed either with steam, i.e., wet vulcanizing or without steam, i.e., dry vulcanizing. In accordance with this invention, either wet or dry vulcanizing may be employed for curing the rubber strip 60. When wet vulcanizing is employed, steam penetrates the shrink strip 80 and comes into contact with the rubber strip 60. The steam also acts to introduce pressure within into the chamber (not shown) so as to prevent the rubber strip 60 from sagging away from the horizontally oriented under-layer 20. As previously mentioned, when wet vulcanizing is performed to cure the rubber strip 60, the sealants 68 are utilized to prevent the steam from getting between the rubber strip 60 and the dry under-layer 20. Where the rubber strip 60 is cured by dry vulcanizing, it is not necessary to utilize sealants 68 because there is no moisture to enter between the rubber strip 60 and the dry under-layer 20. However, after the vulcanizing process is over, it will be necessary to add sealants 68 to prevent any leakage of epoxy resin that may result from movement of the epoxy resin during the infusion process. FIG. 4 illustrates the covered roll after the vulcanizing step has been performed. As shown therein, as a result of the vulcanizing step, the various windings of the rubber strip 60 have fused together to form a homogeneous rubber layer. The shrink strip 80 has shrunk onto the resulting homogeneous layer.

Figure 5:
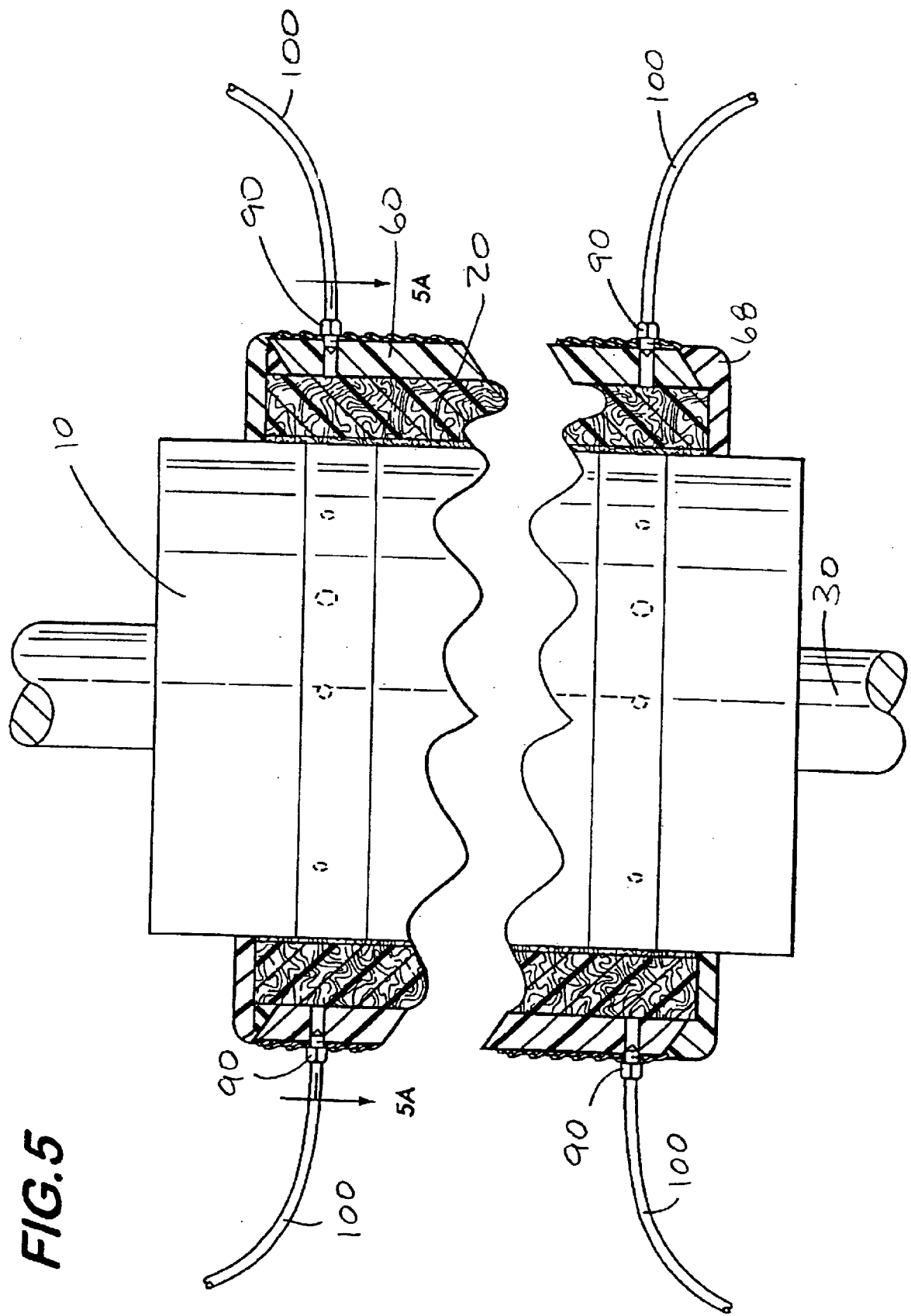
FIG. 5 is a partial sectional view of a roll core covered in accordance with the present invention illustrating a method for infusing resin material into the dry fiber mat under-layer in accordance with the present invention.
Figure 5A:
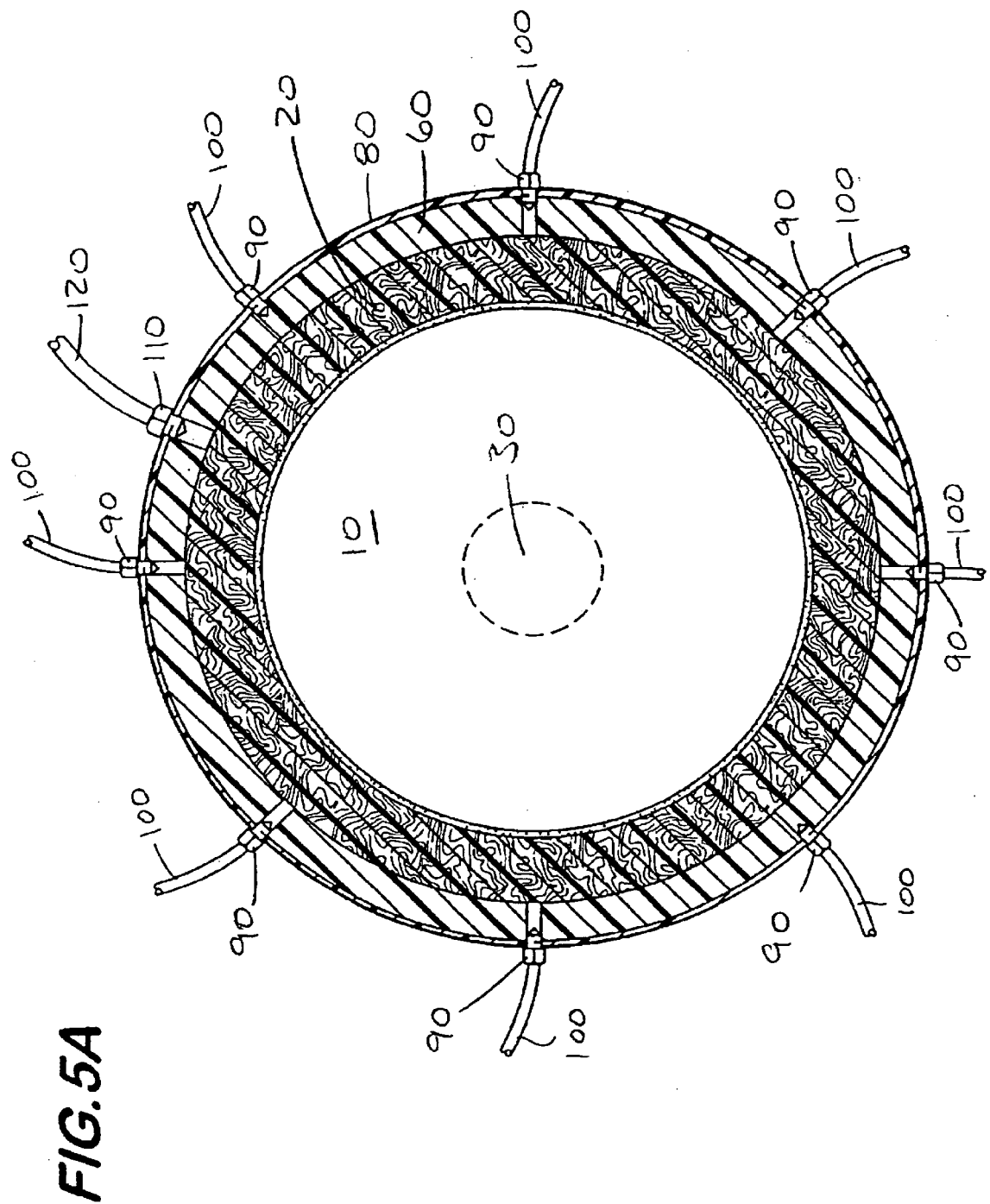
FIG. 5A is a sectional view taken through line 5A—5A of FIG. 5.
Figure 6:
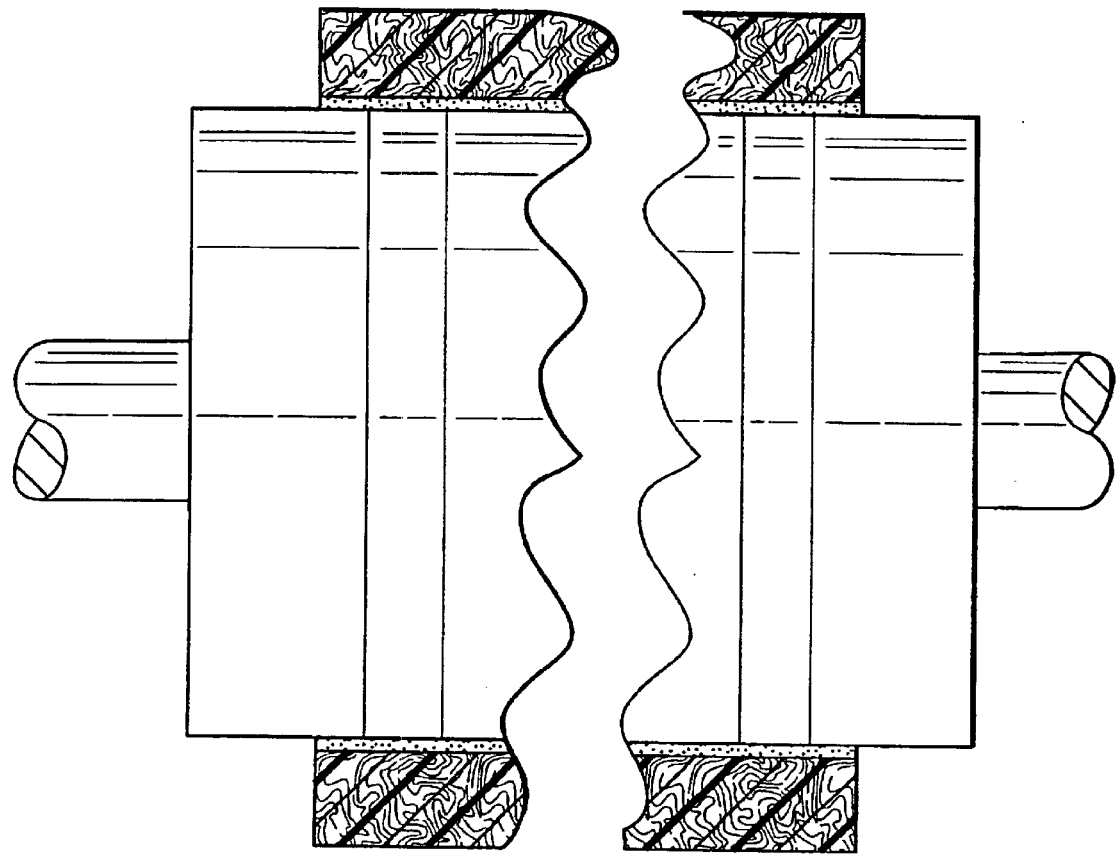
FIG. 6 is a partial sectional view similar to FIG. 1 in that it shows a roll core on which a fiber mat under-layer constructed in accordance with the present invention is applied.

Referring now to FIGS. 5 and 5A, after vulcanizing of the covered roll core 10 is completed, the covered roll core is retained in a horizontal orientation. A hole is drilled at opposite ends of the finished roll core for insertion of a vacuum valve 110 therethrough. As shown in FIG. 5A, the hole drilled for the vacuum valve should be located at the top of the circumference of the horizontally oriented covered roll. A plurality of additional holes are drilled at opposite ends of the finished roll core for insertion of a plurality of infusion entrance valves 90 therethrough Each hole is drilled through the shrink strip 80 and homogeneous rubber layer 60 and into the interior of the under-layer 20. Each of the infusion entrance valves 90 is connected to a line 100 through which the epoxy resin is fed (or supplied). Each of the vacuum valves 110 is connected to a vacuum line 120. First, each infusion entrance valve 90 is shut off to prevent the entry of any infusion resin. Next, a high vacuum is pulled from one or both vacuum valves 110 located at opposite ends to apply a negative pressure to the under-layer 20. After a suitable period of time, e.g., 40 to 50 minutes, each vacuum valve 110 is shut off to maintain the vacuum within the under-layer 20. Lastly, each infusion entrance valve 90 is reopened to allow the infusion of resin through the lines 100 and into the negatively pressurized under-layer 20. Eventually, the epoxy resin will seep from the opposite ends of the under-layer 20 toward the center of the under-layer 20. Once the infused resin meets in the center of the under-layer 20 it spreads to fill the entire void created within the under-layer 20 by the vacuum The infused resin is then allowed to gel at room temperature for a predetermined period of time, e.g., twelve to twenty-four hours. The previously applied sealant 68 provides vacuum enclosure and prevents the infusion resin from leaking downwardly.

The resin used for infusion is epoxy or other preferable resins such as cyanate ester, vinyl ester, phenolic, and other low viscosity thermoset systems. One exemplary resin that may be employed for infusion of the under-layer 20 is known as DERAKANE® manufactured by Dow Chemical Co. Due to the high fiber content of the under-layer 20, it is preferable to utilize an infusion material having a relatively low viscosity, e.g., 300 cps, to assure that the resin infuses throughout the entire under-layer 20. The viscosity and strength of the infusion resin of the present invention is likely to be lower than infusion resins utilized in the prior art which typically are between approximately 1,000 to 2,000 cps. However, when the infusion resin of the present invention is combined with the densely packed fibers of the under-layer 20, and cured, a stronger composite results than under the prior art. Another advantage of utilizing a lower viscosity thermoset resin is that the resin can be infused at room temperature. Under the prior art, it is necessary to heat thermoset resins having higher viscosity prior to the infusion process.

After the infusion process, the roll core is positioned within an oven for curing of the infusion resin while being rotated. After the infusion resin has cured, the homogeneous rubber layer 60 is machined to a desired diameter and smoothness. This may be accomplished by placing the covered roll core horizontally on a lathe (not shown) and machining the outer surface of the homogeneous rubber layer 60 to a predetermined smoothness utilizing a suitable cutting tool.

Figure 7:
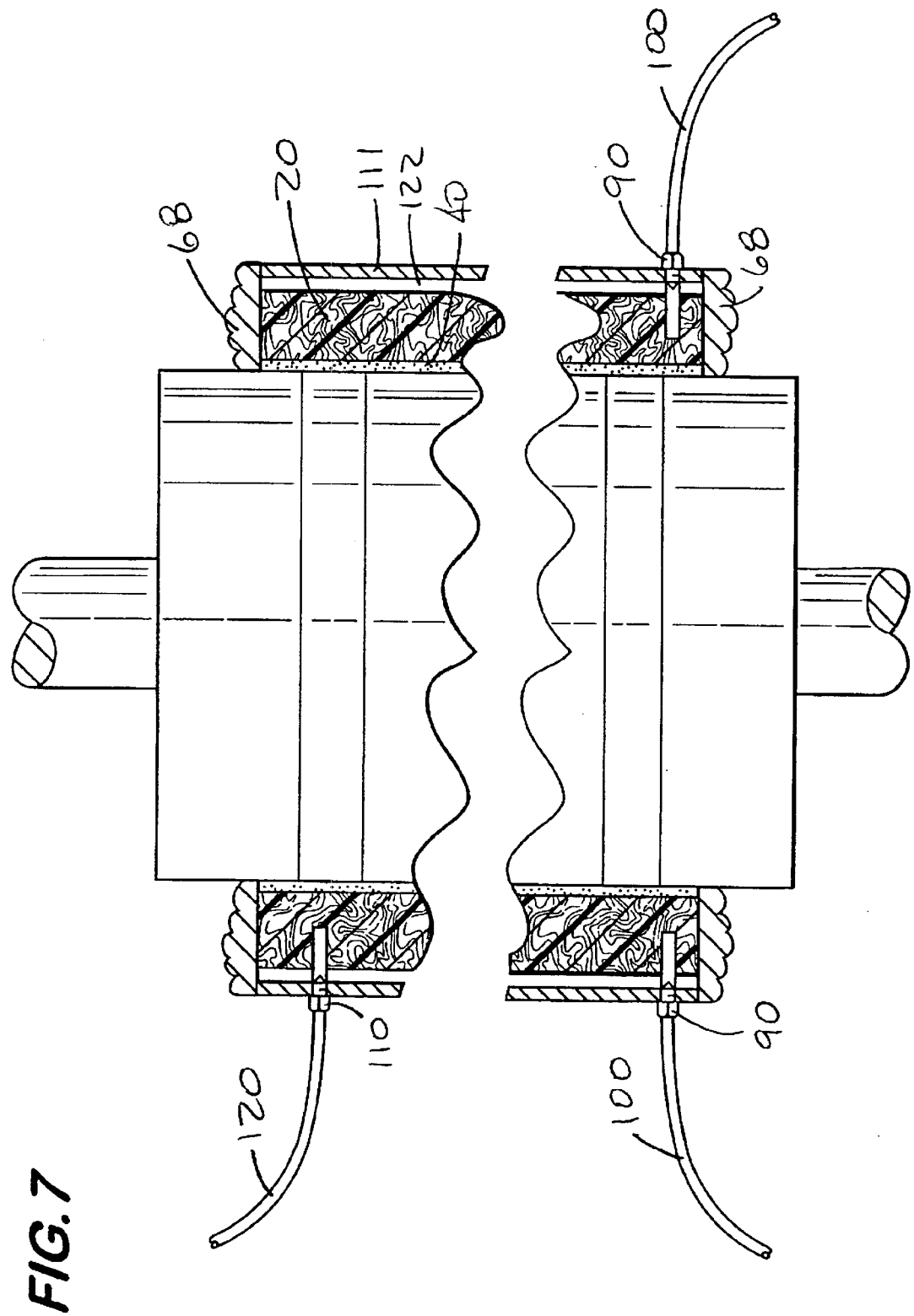
FIG. 7 is a partial sectional view of a manufacturing process conducted in accordance with the present invention wherein a covering layer is cast onto a dry fiber mat under-layer within a mold assembly, the figure also illustrating a method for infusing resin material into the dry fiber mat under-layer once the covering layer is cast onto the under-layer.

Referring now to FIG. 7, the metal roll core 10 with the under-layer 20 applied thereto is shown disposed within the cavity of a mold 111 for a urethane casting. The mold 111 can be formed of any suitable material, e.g., LEXAN®. The mold 111 is formed such that a circumferential gap 122 exists between the under-layer 20 and the inner surface of the mold 111. Next a polyurethane, in liquid form, is poured within the gap 122 from the bottom of the mold 111 to the top. It is to be understood that during this pouring step, it is not desirable for polyurethane to seep deeply into the under-layer 20. Thus, where lower viscosity polyurethanes are selected for the covering layer, it is necessary for the outermost portion of the fiber mat under-layer 20 to be comprised of more densely packed fibers to prevent a considerable amount of seepage of polyurethane into the under-layer 20. Seepage deep into the under-layer 20 is less of a concern where a higher viscosity polyurethane is selected as the covering layer. A small amount of seepage of the polyurethane into the under-layer 20 will actually provide additional mechanical entanglement and improve adhesion between the covering layer and the under-layer 20.

After the urethane has been poured into the mold, it will cure. Thereafter, utilizing the process discussed above, an epoxy resin may be infused into the under-layer 20 through entrance valves 90 and allowed to gel at room temperature for a predetermined period of time to form a high strength under-layer 20.

I claim:

1. A method for producing a covered roll, the covered roll having a multi-layered construction, said method comprising the steps of:
   a. providing a roll core base, said roll core base having two ends, an axial length therebetween and an outer surface;
   b. providing a dry under-layer formed of densely packed fibers;
   c. tightly wrapping said under-layer circumferentially around said roll core base;
   d. applying a covering layer over the dry under-layer to provide an annular axially extending resin infusion channel between said outer surface and said covering layer, said resin infusion channel being filled with said densely packed fibers of said dry under-layer;
   e. providing opening through said covering layer in the vicinity of each of said ends of said roll core base, said openings extending to said resin infusion channel; and
   f. applying a low-viscosity thermoset resin with vacuum to said openings to cause said resin applied to said openings in the vicinity of said ends of said roll core base to infuse into said densely packed fibers over substantially the entire length of said roll core base and to intimately bind with said densely packed fibers of said under-layer within said resin infusion channel.

2. A method as in claim 1 wherein said step of infusing a thermoset resin into the dry under-layer includes the sub-steps of:
   a. drilling vacuum holes through the covering layer in said vicinity of said ends of the roll core base which extend into the under-layer;
   b. sealing off said openings;
   c. creating a vacuum within the under-layer;
   d. sealing off the vacuum holes; and
   e. unsealing said openings.

3. A method as in claim 2 wherein said step of drilling said vacuum holes further includes the sub-steps of:
   a. inserting valves into the opening and vacuum holes; and
   b. connecting the vacuum valves to a vacuum source.

4. A method as in claim 1 wherein prior to said step of tightly wrapping a dry under-layer over the roll core outer surface, said method comprises the further step of applying an adhesive to the roll core surface.

5. A method as in claim 1 wherein said sub-steps b through f are carried out while the covered roll is oriented substantially horizontally.

6. A method as in claim 1 wherein said roll core base has a longitudinal axis, wherein said under-layer comprises at least three sub-layers, with each of said sub-layers being formed of densely packed long continuous fibers, and wherein said dry under-layer is provided so that the fibers of one of said at least three sub-layers extend parallel to said longitudinal axis, the fibers of another of said at least three sub-layers extend perpendicularly to said longitudinal axis, and the fibers of still another of said at least three sub-layers extend randomly.

7. A method for producing a covered roll, the covered roll having a multi-layered construction, said method comprising the steps of:
   a. providing a roll core base, said roll core base having two ends, an axial length therebetween, a central region and an outer surface;
   b. providing a dry under-layer formed of densely packed fibers;
   c. tightly wrapping said under-layer circumferentially around said roll core base;
   d. applying a covering layer over the dry under-layer to provide an annular axially extending resin infusion channel between said outer surface and said covering layer, said resin infusing channel being filled with said densely packed fibers of said dry under-layer;
   e. providing openings through said covering layer in the vicinity of each of said ends of said roll core base, said openings extending radially inward to said under-layer; and
   f. applying a low viscosity thermoset resin to said openings with vacuum to infuse said resin into said dry under-layer, said infusing proceeding from said ends of said roll core base to said central region, to cause said resin to intimately bind with said densely packed fibers of said dry under-layer, whereby said infusing occurs in an axial direction over substantially the entire axial length between said two ends of said roll core base.

8. A method for producing a covered roll, the covered roll having a multi-layered construction, said method comprising the steps of:
   a. providing a roll core base, said roll core base having two ends, an axial length therebetween, a central region and an outer surface;
   b. providing a dry under-layer formed of densely packed fibers;
   c. said dry under-layer being formed of a plurality of sublayers, at least one sublayer of said plurality of sublayers having randomly oriented densely packed fibers and at least one sublayer of said plurality of sublayers having substantially continuous unidirectional densely packed fibers;

d. tightly wrapping said under-layer circumferentially around said roll core base;
e. applying a covering layer over the dry under-layer to provide an annular axially extending resin infusion channel between said outer surface and said covering layer, said resin infusing channel being filled with said densely packed fibers of said dry under-layer;
f. providing openings through said covering layer in the vicinity of each of said ends of said roll core base, said openings extending radially inward to said under-layer; and
g. applying a low viscosity thermoset resin to said openings with vacuum to infuse said resin into said dry under-layer, said infusing proceeding from said ends of said roll core base to said central region to cause said resin to intimately bind with said densely packed fibers of said dry under-layer, whereby said infusing occurs in an axial direction over substantially the entire axial length between said two ends.

* * * * *